United States Patent [19]

Zentgraf et al.

[11] Patent Number: 5,161,508
[45] Date of Patent: Nov. 10, 1992

[54] LOAD ADJUSTMENT DEVICE

[75] Inventors: Matthias Zentgraf, Frankfurt am Main; Gerd Hickmann, Schwalbach/Ts.; Peter Volz, Frankfurt am Main, all of Fed. Rep. of Germany

[73] Assignee: VDO Adolf Schindling AG, Frankfurt am Main, Fed. Rep. of Germany

[21] Appl. No.: 688,904

[22] Filed: Apr. 19, 1991

[30] Foreign Application Priority Data

May 7, 1990 [DE] Fed. Rep. of Germany ......... 401450

[51] Int. Cl.$^5$ .................................. F02D 7/00
[52] U.S. Cl. ..................... 123/400; 123/339
[58] Field of Search ............ 123/399, 400, 361, 339

[56] References Cited

U.S. PATENT DOCUMENTS

| | | | |
|---|---|---|---|
| 4,787,353 | 11/1988 | Ishikawa | 123/399 |
| 4,928,647 | 5/1990 | Villanyi | 123/400 |
| 4,944,268 | 7/1990 | Wilde | 123/400 |
| 5,014,666 | 5/1991 | Westenberger | 123/400 |
| 5,036,813 | 8/1991 | Pfalzgraf | 123/339 |
| 5,046,575 | 9/1991 | Asayama | 123/399 |

FOREIGN PATENT DOCUMENTS

| | | |
|---|---|---|
| 0107265 | 5/1984 | European Pat. Off. . |
| 0341341 | 11/1989 | European Pat. Off. . |
| 3641244 | 6/1988 | Fed. Rep. of Germany . |
| 4027069 | 3/1991 | Fed. Rep. of Germany . |
| 2648186 | 12/1990 | France . |

*Primary Examiner*—Carl S. Miller
*Attorney, Agent, or Firm*—Martin A. Farber

[57] ABSTRACT

A load adjustment device is provided with a throttle valve (9) which determines the output of an internal combustion engine and is fastened, fixed for rotation, to a throttle-valve shaft (32), which is mounted in a throttle-valve housing (30). In idle operation, the throttle-valve shaft (32) is adjusted by an electric motor (14) and a four-link gearing (16) connected behind it. This includes a pinion (14) which is arranged on an output shaft of the electric motor (14) and meshes with a gear segment (50) which is connected for drive via a second link (53) to a rotor (54) which drives the throttle-valve shaft (32). Due to the advantageous arrangement of the four-link gearing (16), a very large transmission ratio can be achieved between the output shaft (40) of the electric motor 14 and the throttle-valve shaft (32), so that a very small, cost-efficient electric motor is sufficient.

14 Claims, 5 Drawing Sheets

LOAD ADJUSTMENT DEVICE

FIELD AND BACKGROUND OF THE INVENTION

The present invention relates to a load adjustment device having a throttle valve (9) which determines the output of an internal combustion engine and is attached, fixed for rotation, to a throttle-valve shaft (32) mounted in the throttle-valve housing (30). The throttle-valve shaft has a mechanical articulation side on the accelerator side and a setting-motor articulation side with which there is associated a coupling element for the mechanical uncoupling of the throttle valve from a setting motor having a pinion (41) which is connected for driving via additional transmission elements to the throttle-valve shaft (32).

In such a load adjustment device the setting motor is provided on the driven side at the end of its shaft with a pinion which is in engagement with an intermediate gear which, in its turn, cooperates with a drive gear arranged on a mounting shaft and correspondingly displaces a throttle valve, arranged in the throttle-valve housing, into a desired position. Since the structural space between the mounting shaft of the setting motor and the throttle-valve shaft is very small, the size of the individual gears is also fixed, and thus also the total gear ratio of the gearing for the adjustment of the throttle valve. Since the gear ratio of the gearing cannot be selected as one might please, the setting motor must be designed substantially stronger so that the individual frictional resistances of the parts of the gearing and the adjustment forces opposing the swinging of the throttle valve can be overcome.

SUMMARY OF THE INVENTION

In contradistinction to this, it is an object of the present invention so as to develop and arrange the individual setting members for a swinging of the throttle valve wherein a gearing having a large gear ratio can be provided in order to overcome the torque acting on the throttle valve.

According to the invention, a pinion (41) is connected for drive via at least one articulated link gearing having a gear segment (50) to the throttle-valve shaft (32). The use of an articulated link gearing permits the arrangement of the individual gearing parts within the smallest possible space in such a manner that a very large gear ratio can be obtained. This is achieved in advantageous manner by the fact that a gear segment is employed instead of a gear wheel of very large diameter.

It is advantageous for this that the articulated link gearing be developed as a three-link or four-link gearing (16) and that it has on the drive side the pinion (41) which is in engagement with the gear segment (50) which is developed as first link (51). Since the gear segment is also developed as link, there is obtained in simple manner a multiple articulated link gearing with which very large setting forces can be overcome within a very small space. Thus, a low-power and therefore cost-efficient electric motor can be used, which contributes to lowering the cost of the entire load adjustment device.

According to a feature of the invention, it is advantageous for the first link (51) to be swingably mounted on the throttle-valve housing (30) and for a second link (53) to be articulated between the point of articulation (link place 22) of the first link on the throttle-valve housing (30) and the gear segment 50 of said first link (51), the second link (53) being pivotally connected, at its end opposite the place of articulation to a rotor 54 which is connected, directly or indirectly, for drive to the throttle-valve shaft (32). A large gear ratio can be obtained in the manner that the second link (53) provided between rotor (54) and gear segment (50) is pivotally connected at its one end in the region of the place of articulation (22) of the first link (51) to the throttle-valve housing (30) and at its other end to the outer end of the rotor (54). The closer the point of articulation of the second rod is to the upper place of articulation of the second link, the larger can the gear ratio for the four-link gearing be easily selected without structural changes on the throttle-valve housing being necessary for this. The use of a multi-link gearing is advantageous, in particular, whenever the center-to-center distance between the drive pinion and the throttle-valve shaft is very small and can no longer be changed.

In a further development of the invention, it is advantageous for the rotor (54) to have a driver element (15) which is connected, fixed for rotation, via a control-element part (56) which permits free travel to the throttle-valve shaft (32). In this way, the result is obtained in simple manner that, upon actuation of the setting motor, the throttle valve is displaced for the idling operation corresponding to a setting variable.

It is, furthermore, advantageous for this purpose that the end of the throttle-valve shaft (32) be developed as drive element (56) having at least one stop (27, 28) against which the driver element (15) can be brought when the setting motor (14), developed as electric motor, is actuated.

As a further development of the invention, it is advantageous that the one lever arm (33) of the rotor (54) can be applied against the rod (53) and its other lever arm against an adjustable stop (35), the adjustable stop (35) being displaceable against the action of a spring (39). In this way, assurance is had that, upon a malfunction in the electronic regulator, emergency operation can be maintained and that the rotor, and thus the throttle valve, can be displaced into the emergency position by means of the spring via the adjustable stop.

The gear segment 50 is advantageously swingable through a defined angular range between two stops (59, 60) so that the setting range of the gear segment, and thus the setting range of the setting motor, can be precisely delimited in simple manner.

The gear ratio between the pinion (41) and the throttle-valve shaft (32) can be larger than 1:20.

Additional features of the invention are indicated in the description of the figures, it being pointed out in this connection that all individual features and combinations of individual features are essential to the invention.

BRIEF DESCRIPTION OF THE DRAWINGS

With the above and other objects and advantages in view, the present invention will become more clearly understood in connection with the detailed description of the preferred embodiment, when considered with the accompanying drawings, of which.

DETAILED DESCRIPTION OF THE PREFERRED EMBODIMENT

Figure 1:
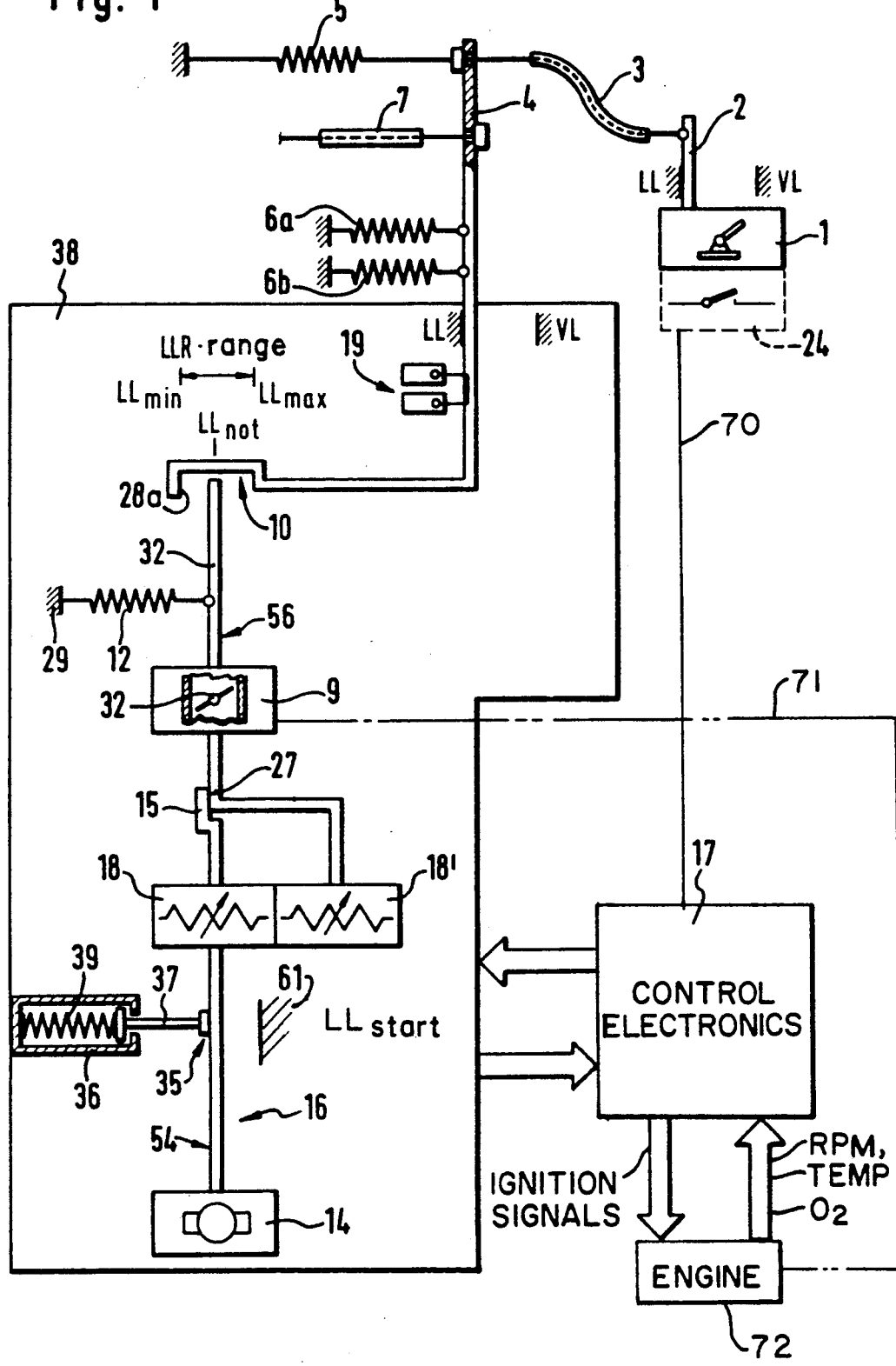
FIG. 1 is a block diagram illustrating the basic function of the load adjustment device of the invention.

The parts contained within the frame 38 of FIG. 1 form a setting member and load adjustment device which are combined in one structural unit. The load adjustment device includes a setting motor or electric motor 14 which is connected for drive via a four-link gearing 16 to a throttle valve 9. FIGS. 2–5 show the four-link gearing 16 in detail, while FIG. 1 illustrates the principle of operation of the four-link gearing 16. For this reason, certain gear parts have been omitted in FIG. 1 for the sake of simplicity.

Figure 2:
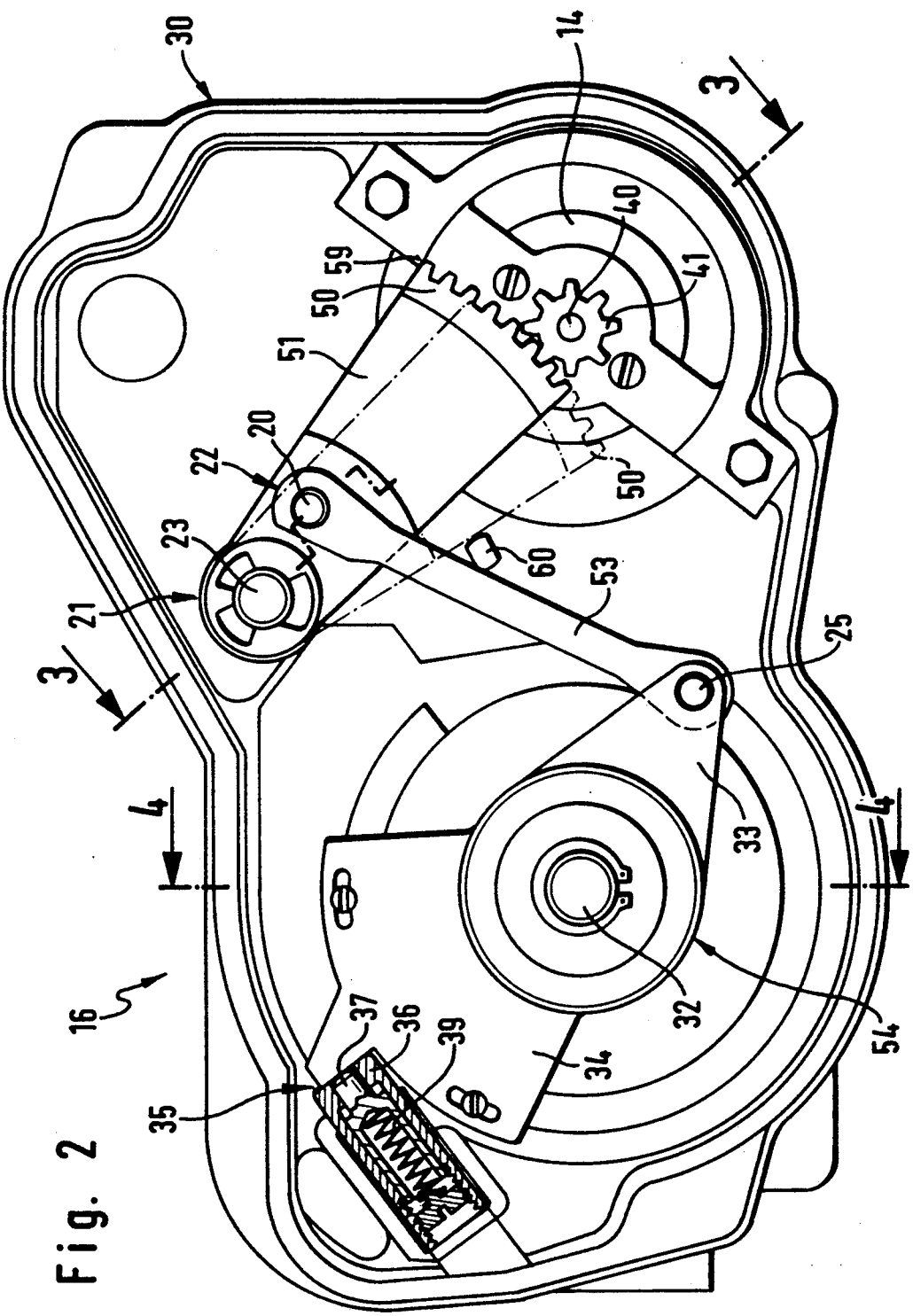
FIG. 2 is a side view of the load adjustment device having a four-link gearing for the adjustment of the throttle valve.
Figure 3:
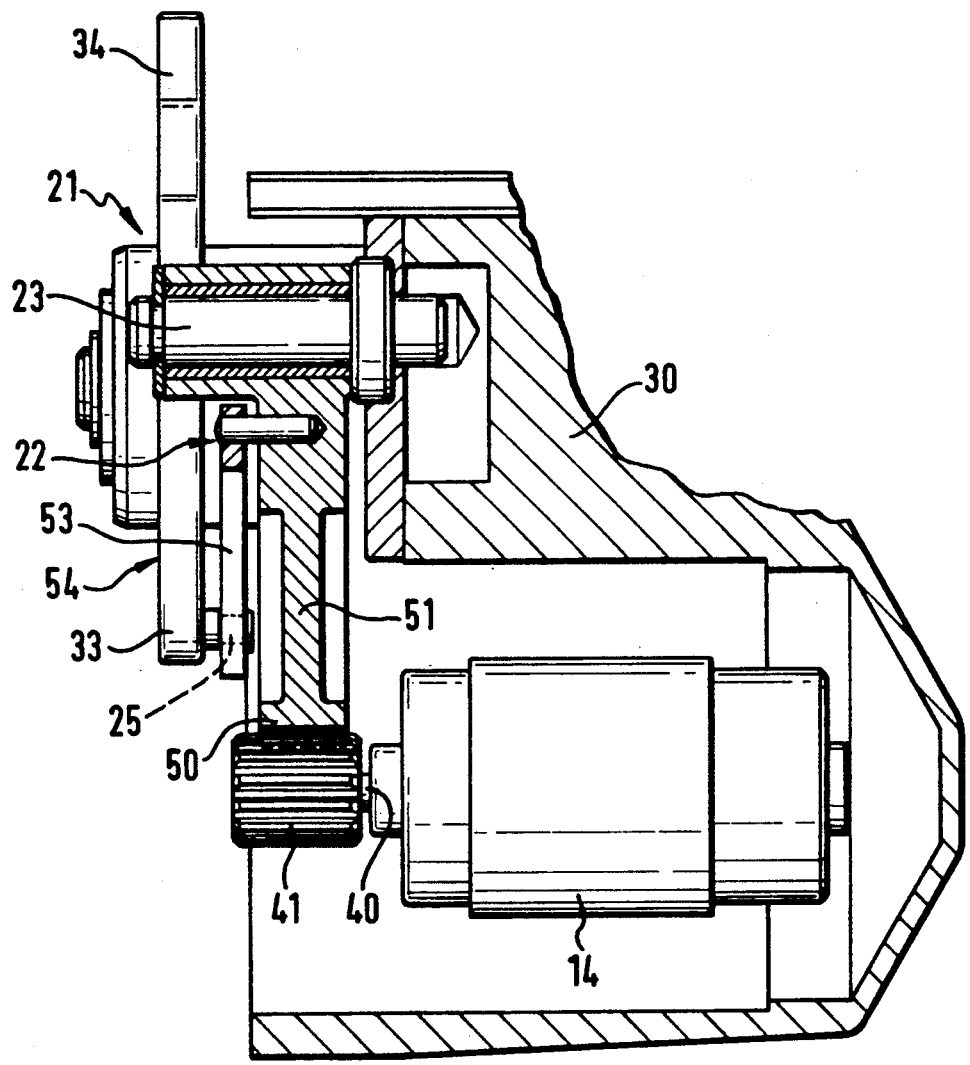
FIG. 3 is a cross section through the load adjustment device along the line 3—3 of FIG. 2.
Figure 4:
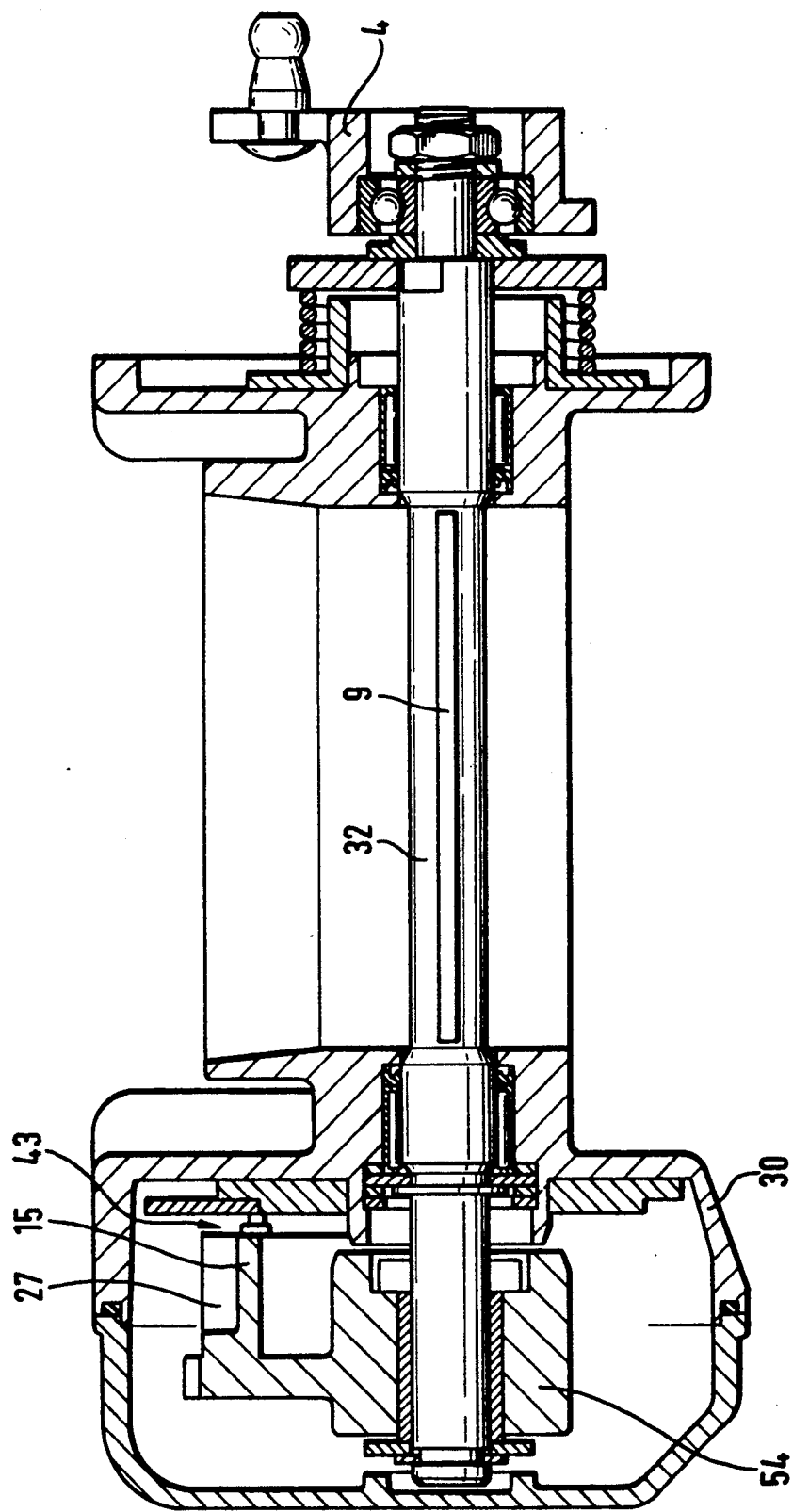
FIG. 4 is a longitudinal section through the load adjustment device along the line 4—4 of FIG. 2.

Upon activation of the electric motor 14 which is shown diagrammatically in FIG. 1, the setting forces of the electric motor 14 are transmitted to the throttle valve 9 by the four-link gearing 16 shown in FIGS. 2-4, in this way effecting a displacement of the throttle valve 9.

On its secondary-drive side, the electric motor 14 has an output shaft 40 having a pinion 41 which is in engagement with the gear segment 50. The gear segment 50 is part of a first link 51 which is mounted o the outside of the throttle-valve housing 30 for swinging by means of a pivot pin 23 within a well-defined angular range between upper and lower stops 59, 60.

In this way, the setting range of the gear segment 50 and thus the setting range of the electric motor 14 are precisely limited and the end position of the throttle valve 9 is precisely defined. Displacement of the throttle valve 9 beyond this position is not possible due to the stops 59, 60.

In the upper region of the articulation place 21 of the first link 51 which is formed by the pivot pin 23, a connecting rod or second link 53 is pivotally connected to the first link 51 by means of a pivot pin 20 so that a very large lever arm is formed on the first link 51 between the gear segment 50 and the place of articulation 22 of the second link 53. The end of the second link 53 opposite the place of linkage 22 is pivotally connected to a rotor 54 (see FIG. 2) which is developed as a control-element part (see FIG. 1). In the diagram of FIG. 1, the rotor 54 is represented by a control-element part 54.

Figure 5:
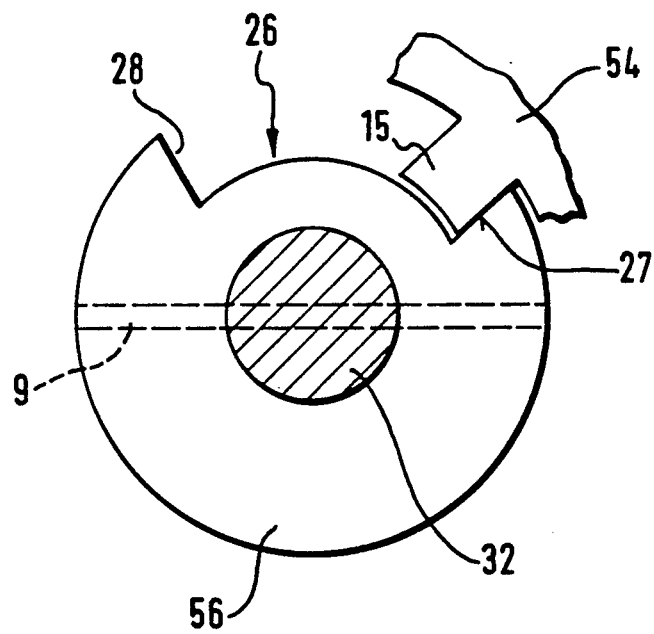
FIG. 5 shows the throttle-valve shaft with a free-travel segment and a driver element of a rotor.

As can be noted from FIG. 2, the rotor or control-element part 54 is seated on the outer end of a throttle-valve shaft 32 and, as can be noted from FIG. 5, is connected for driving in only one direction (in FIG. 5 in clockwise direction), via a driver element 15 with a stop 27 provided on the throttle-valve shaft 32. The stop 27 is formed by a recess or free-travel segment 26 so that the throttle-valve shaft 32 can be displaced indirectly via an accelerator pedal 1 even if the idle control is not active. The free travel segment 26 is limited by another stop 28. The free travel segment 26 is provided as recess in a control-element part 56 which is arranged, fixed in rotation, on the throttle-valve shaft 32 or is connected as a single part with it. If the electric motor 14 is actuated, then the throttle valve 9 which is arranged on the throttle-valve shaft 32 is opened accordingly in direction of further control via the four-link gearing 16.

The rotor 54 is developed as double-armed lever, the one lever arm 33 of which is pivotally attached to the second link 53 via the pivot pin 25 while the other lever arm 34 can be brought against an adjustable stop 35. The adjustable stop 35 consists of a bolt 37 which is arranged in a cylindrical housing 36 and is displaceable against the force of a spring 39 contained in the housing 36. The adjustable stop 35 has the task of displacing the rotor 54 into the idle emergency position $LL_{not}$ upon failure of the control electronics 17. Thus, for the situation of the idle emergency control range, the throttle valve 9 is brought into this position $LL_{not}$ by the adjustable stop 35 and kept there. If the electric motor 14 is activated, it can displace the control-element part or rotor 54 against the action of the spring 39 in the idle direction $LL_{min}$, the throttle valve 9 being moved along via the spring 12. Furthermore, the throttle valve 9 can be displaced in upward control direction up to the stop $LL_{start}$ 61, the control of the electric motor 14 being effected via the control device 17.

The pretensioning force of the spring 39 which is contained in the housing 36 can be changed by an adjustment screw provided in the housing 36.

The transmission ratio of the link gearing 16 between the driven shaft of the electric motor 14 and the throttle-valve shaft 32 is greater than 1:20, it being also possible, due to the advantageous arrangement of the gear segment 50, for it to be substantially greater, for instance 1:37.

As already explained, FIG. 1 shows the basic function of the load adjustment device in the case of an idle control setting member in the function of the idle control upon emergency position.

As can be noted from FIG. 1, the load adjustment device can be adjusted via an accelerator pedal 1, which, upon actuation, displaces an accelerator-pedal lever 2 between an idle stop LL and a full-load stop VL. The lever 2 is connected to a driver 4 by a gas cable 3, such as a Bowden cable, so that the driver 4 is displaced in direction towards the full load stop VL upon actuation of the accelerator pedal 1. A return spring 5 is connected to the driver 4, said spring urging the driver in the idle direction LL. Two additional return springs 6A and 6B urge the driver in idle direction LL. The return springs 6A and 6B are so designed that they have redundant effects on the return drive. As long as the gas cable 3 is not acted on, the driver 4 rests against the idle stop LL associated with it. The driver 4 can furthermore be pulled in the direction of the idle stop LL by an automatic cable 7 of a gearing not shown in the drawing.

The driver 4 cooperates directly with a first control-element part 56 which serves for displacing the throttle valve 9 of an internal combustion engine. The control element 56 is shown merely diagrammatically in FIG. 1 and can correspond to the throttle-valve shaft 32 shown in FIGS. 2 to 5. The end of the driver 4 remote from the gas cable 3 is provided with a recess 10 into which the end of the first control-element part 56 engages. Adjoining the recess 10 in the driver 4 there is a stop 28a, the driver 4 coming to rest against this stop when the accelerator pedal 1 displaces the stop 28a out of the $idle_{min}$ position beyond the idle position.

Below the recess 10 there is provided a spring 12, one end of which is attached to a fixed point 29 while its other end is attached to the first control-element part 56 and urges the latter in idle direction. As a result of the fixed arrangement of the spring 12, a direct resetting of the throttle valve 9 is achieved. The spring 12 is active over the entire adjustment range of the control-element part 56 and thus over the entire load range of the internal combustion engine. The spring 12 acts in this way in the same direction as the two restoring springs 6a and 6b.

In addition to the first control-element part 56, the load adjustment device has a second control-element part, namely, the aforementioned rotor 54 which is attached to an electric motor 14. The control-element part or rotor 54 is shown diagrammatically in FIG. 1 and in detail in FIGS. 2 to 5. The two control-element parts 56 and 54 are not firmly attached to each other but are coupled merely in one direction of movement, namely in the direction of the upward control emergency position. For this purpose, one end of the second control-element part or rotor 54 has the driver element 15 which can come against the stop 27 provided on the first control-element part 56 if the control electronics 17 forming part of the load adjustment device fails. The second control-element part 54 is associated with the throttle-valve shaft 32. In this way, the operating safety of the vehicle is assured upon failure of the control electronics 17 or upon failure in other components of the motor vehicle. In order to assure operating safety, a setting element or a spring 39 is provided which, via the second control-element part or rotor 54, displaces the first control-element part 56 into the idle emergency position $LL_{not}$ by means of the driver element 15 which acts in only one direction.

In the drawing, FIG. 1 diagrammatically shows the control electronics 17 which contains the processing, logic and control circuits. In its digital part, the control electronics 17 stores values for the vehicle adjustment and processes the digital or digitized values of various input variables which then take over the desired position of the throttle valve 9 via an analog part. With the control electronics 17, there cooperates an actual-value detection device 18' forming part of the first control-element part 56 and an actual-value detection device 18 which is associated with the second control-element part 54 and detects the instantaneous position of this control-element part or rotor 54. In addition, the control electronics 17 detects signals via an idle contact 19 which is activated by the driver 4 when the latter comes to rest against the idle stop LL associated with it.

In cooperation with the two actual-value detection devices 18 and 18' and two external reference values, the electronic control device 17 serves the purpose of building up a safety logic concerning the control by the first and second control-element parts 54 and 56 respectively. As soon as the control electronics 17 or the electric motor 14 no longer functions properly, the control-element part 56 is moved into the idle emergency position $LL_{not}$ by the spring 39 which is pretensioned in the direction of the maximum idle position, and the throttle valve 9 is thereby displaced into the corresponding position.

If a speed control operates in the idle control range of the internal combustion engine via the control electronics 17 and the electric motor 14, then this leads initially to a movement of the second control element 54 in the direction $LL_{start}$. Upon further upward control, the idle contact 19 disconnects the control electronics 17 from the circuit. The electric motor 14 is now no longer activated. A corresponding displacement of the throttle valve 9 takes place above the idle control range only via the accelerator pedal 1, the gas cable 3 and the driver 4.

By the movement of the driver 4 in upward control direction, the control-element part 56 is displaced and thereby also the throttle valve 9. The position of the first control-element part 56 which is connected, fixed for rotation, to the throttle-valve shaft 32 is detected by an actual-value detection device 18' which is associated with the throttle-valve shaft 32 and which consists of a potentiometer 43 (FIG. 4) arranged in the throttle-valve housing 30 and of a wiper which is attached, fixed for rotation, to the throttle-valve shaft 32. The actual-valve detection device 18 forwards this information to the control electronics 17, which provides that the electric motor 14 is no longer activated outside the idle control range.

A switch 24 is operated by the accelerator pedal 1 to provide an electric signal via line 70 to the control electronics 17 indicating when the pedal is at a specific position, such as by way of example, in the fully retracted position. The throttle valve 9 is connected via an intake air pipe 71 to an internal combustion engine 72. Well-known sensors (not shown) within the engine 72 provide operating parameters such as exhaust oxygen $O_2$ concentration, water temperature and engine RPM (revolutions per minute) to the control electronics 17. The control electronics 17 outputs electric signals such as ignition signals to the engine 72.

We claim:

1. A load adjustment device for an internal combustion engine, comprising
   a throttle valve which determines the output of the engine;
   a throttle valve housing, and a throttle-valve shaft mounted in the throttle-valve housing, the throttle-valve being mounted to the shaft for rotation therewith, the throttle-valve shaft having a mechanical articulation side on an accelerator side of the shaft and a setting-motor articulation side;
   a setting motor, and a transmission including transmission elements connecting between the setting motor and the throttle-valve shaft, said transmission elements including a pinion at an output of the motor and at least one articulated link gearing having a gear segment;
   a coupling element on the motor articulation side of the shaft and connecting with said transmission for a mechanical uncoupling of the throttle valve from the setting motor;
   a rotor for driving the throttle-valve shaft;
   wherein the pinion is connected for drive via said at least one articulated link gearing having the gear segment to said throttle-valve shaft;
   in said transmission, the first link is swingably mounted by a pivot on the throttle-valve housing, there being a second link of the transmission articulated between a point of articulation with the first link located between said pivot and the gear segment of said first link, the second link being pivotally connected, at its end opposite the point of articulation to the rotor;
   said rotor has a first lever arm and a second lever arm;
   said first lever arm of the rotor pushes against the second link of said transmission; and
   said second lever arm of said rotor is limited in movement by said adjustable stop.

2. A load adjustment device according to claim 1, wherein
   the transmission is formed as an articulated multiple link gearing comprising, on a drive side of the pinion, a first link including a gear segment, the gear segment being in engagement with the pinion.

3. A load adjustment device according to claim 1, wherein
the second link is pivotally connected at a first end thereof to the first link at the point of articulation with first link, and at its other end to an outer end of the rotor.

4. A load adjustment device according to claim 1, further comprising a control element; and
wherein the rotor has a driver element which is connected, fixed for rotation, via the control-element to permit free travel of the throttle-valve shaft.

5. A load adjustment device according to claim 4, wherein
upon actuation of the setting motor, the throttle valve is displaced by the setting motor, acting through the transmission, for idling operation corresponding to a setting variable.

6. A load adjustment device according to claim 4, wherein
the driver element is integrally formed with an end of the throttle-valve shaft, the load adjustment device having at least one stop for limiting movement of the driver element upon actuation of the setting motor.

7. A load adjustment device according to claim 1, further comprising a spring; and
wherein the adjustable stop is displaceable against the action of the spring.

8. A load adjustment device according to claim 2, further comprising a first stop and a second stop; and
wherein the gear segment is swingable through a defined angular range between said first stop and said second stop.

9. A load adjustment device according to claim 2, wherein
said transmission provides a gear ratio between the pinion and the throttle-valve shaft, the gear ratio being larger than 1:20.

10. A load adjustment device for an internal combustion engine comprising
a throttle valve, a throttle-valve shaft, and a throttle valve housing, the throttle valve being connected and fixed for rotation with the throttle valve shaft, the throttle-valve shaft being rotatably mounted in the throttle valve housing, the throttle-valve shaft having a first end and a second end opposite the first end;
a driver, a lever arm, and an accelerator for adjusting fuel flow to the engine, the accelerator being connected with the first end of the throttle valve shaft by the driver and the lever arm;
an articulated multiple link gearing comprising a pinion, a first link with a gear element which engages the pinion, a rotor having a lever arm which extends from the rotor for driving the throttle valve shaft, and a second link interconnecting the first link with the lever arm;
a setting motor, the setting motor being connected with the second end of the throttle valve shaft by the articulated multiple link gearing;
an adjustable stop, an electronic control device for operating the motor during engine idle, and a control-element part having a free-travel segment, the control-element part being fixed to the throttle-valve shaft;
wherein the rotor has a driver element which interacts with the free travel segment of the control element part to permit free travel of the throttle valve shaft; and
the rotor further has a second lever arm the movement of which is limited by the adjustable stop.

11. A load adjusting device according to claim 10, wherein
the first link of the multiple link gearing is swingably mounted by a pivot on the throttle valve housing,
the second link is articulated between a point of articulation with the first link located between said pivot and the gear segment of said first link; and
the second link is pivotally connected to the rotor at an end of the second link opposite the point of articulation.

12. A load adjustment device according to claim 10, further comprising
a spring providing a spring force to the adjustable stop, the adjustable stop being displaceable against the spring force.

13. A load adjustment device according to claim 11, further comprising
a first stop and a second stop disposed on opposite sides of and spaced-apart from said first link, wherein said gear segment is swingably through an angular range between said first and said second stops, said angular range being defined by said first and said second stops.

14. A load adjustment device according to claim 11, wherein
said multiple link gearing provides a gear ratio between the pinion and the throttle valve shaft which is larger than 1:20.

* * * * *